Figure 1:
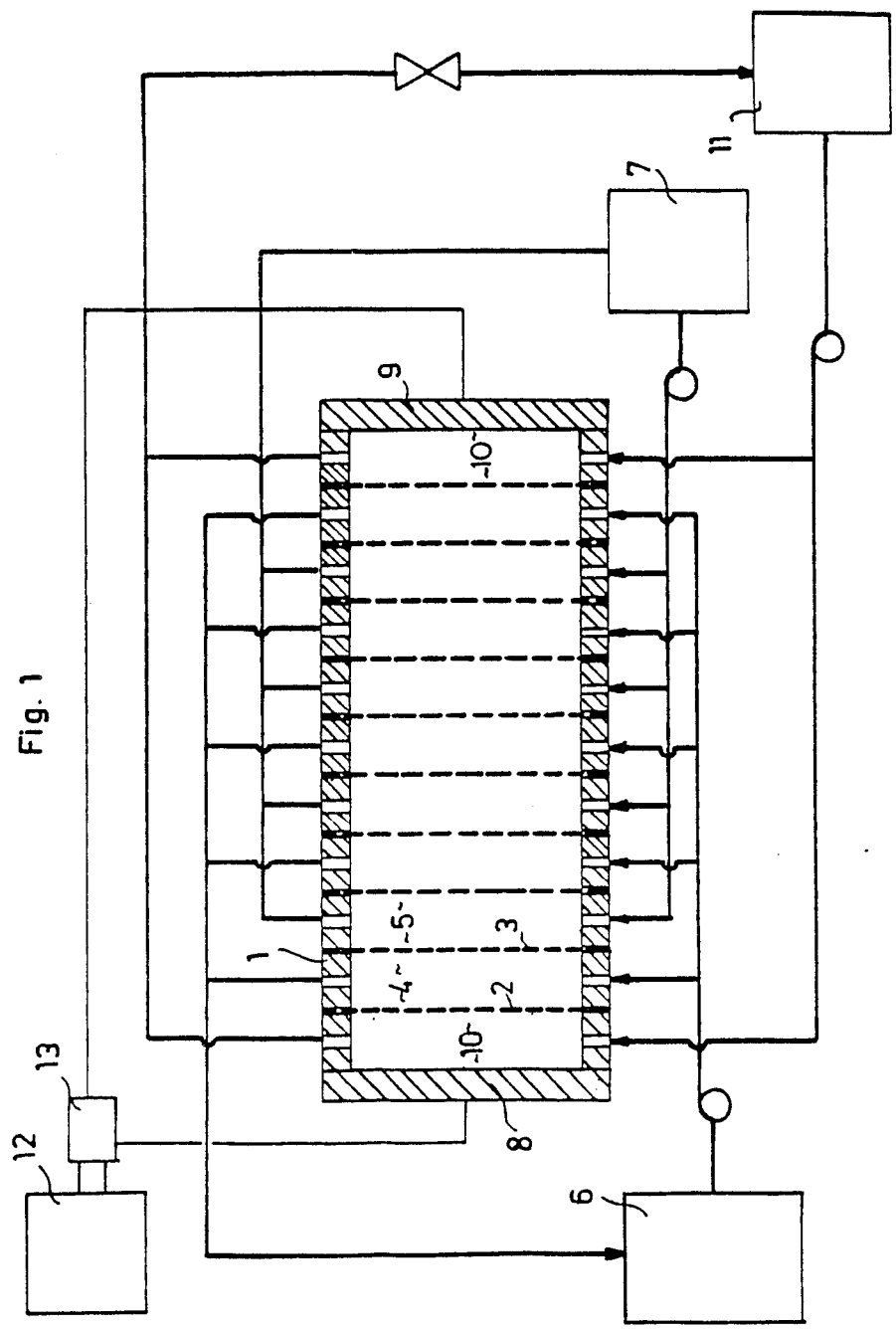

United States Patent [19]

Sanchez et al.

[11] Patent Number: 4,758,320

[45] Date of Patent: Jul. 19, 1988

[54] PROCESS AND APPARATUS FOR SEPARATION OF SOLID PARTICLES OR MACROMOLECULES IN SOLUTION BY ELECTROFILTRATION

[75] Inventors: Victor Sanchez, Ramonville Saint-Agne; Pierre Aimar, Toulouse; Jean Mahenc, Lacroix-Falgarde, all of France

[73] Assignee: Centre National de la Recherche Scientifique (C.N.R.S.), Anatole, France

[21] Appl. No.: 19,230

[22] PCT Filed: Jun. 10, 1986

[86] PCT No.: PCT/FR86/00199

§ 371 Date: Jan. 27, 1987

§ 102(e) Date: Jan. 27, 1987

[87] PCT Pub. No.: WO86/07280

PCT Pub. Date: Dec. 18, 1986

[30] Foreign Application Priority Data

Jun. 13, 1985 [FR] France ................................. 85 09124

[51] Int. Cl.[4] ..................... B01D 13/00; B01D 13/02; C02F 1/44
[52] U.S. Cl. ................................. 204/182.3; 204/301; 204/152; 204/182.4; 210/650
[58] Field of Search ............... 204/182.3, 182.4, 182.5, 204/182.6, 301, 131, 130, 150, 151, 152, 186, 182.2, 305, DIG. 9; 210/650, 651, 652, 653, 654, 655

[56] References Cited

U.S. PATENT DOCUMENTS

| | | | |
|---|---|---|---|
| 2,247,065 | 6/1941 | Pauli et al. | 204/182.3 |
| 3,099,615 | 7/1963 | Kollsman | 204/301 X |
| 3,309,301 | 3/1967 | Kollsman | 204/182.4 X |
| 3,562,139 | 2/1971 | Leitz | 204/296 |
| 3,870,617 | 3/1975 | Bourat | 204/301 |

OTHER PUBLICATIONS

J. M. Radovich, N. S., Mason, R. E., Sparks, "Coupling Electrophoresis with Ultrafiltration for Improved Processing of Plasma Proteins", Separation Science & Technology, 15, (8), pp. 1491–1980.

Primary Examiner—John F. Niebling
Assistant Examiner—John S. Starsiak, Jr.
Attorney, Agent, or Firm—Harold H. Dutton, Jr.

[57] ABSTRACT

The invention relates to a process for separating electrically charged solid particles or macromolecules contained in a solution by using a semi-permeable membrane which is specific for the separation to be carried out and by applying an electric field to reduce the concentration gradient in the immediate vicinity of the membrane. In the present invention, a plurality of semi-permeable membranes (2, 3) are arranged directly oppositely each other so as to define an alternation of low and high pressure compartments (4, 5), and periodically the direction of the electric field is reversed. The process of the invention allows increasing the exchange area while benefiting of permanently increased efficiency from the applied electric field.

12 Claims, 6 Drawing Sheets

PROCESS AND APPARATUS FOR SEPARATION OF SOLID PARTICLES OR MACROMOLECULES IN SOLUTION BY ELECTROFILTRATION

The invention relates to a process for separating solid particles or macromolecules contained in a solution. Its object is to improve a process usually called "electro-ultrafiltration" comprising filtering the pressurized solution through a semi-permeable membrane which is specific to the separation involved and in applying an electric field to reduce the concentration gradient in the immediate vicinity of the membrane. The invention also comprises apparatus for carrying out the process.

The technique of electro-ultrafiltration was recently developed from ultrafiltration techniques in which a pressure difference is applied to make the solution being treated cross a semi-permeable membrane of which the cut-off threshold is adjusted to the macromolecules to be retained for the range of 5,000 to 100,000 Daltons. However this concentration gradient (which still is called "concentration polarization" by the experts) quickly forms in the vicinity of the semi-permeable membrane when these techniques are used and restricts the flow density of the permeate and hence the separation efficiency. The technique of electro-ultrafiltration reduces this concentration gradient if the macromolecules are electrically charged by applying a DC electric field to the solution. The direction of this field is such that the macromolecules tend to move away from the membrane by electrophoretic migration. The following publications in particular describe this kind of process:

U.S. Pat. No. 3,905,886 (Wang)

U.S. Pat. No. 4,043,896 (Aulgren),

J. M. Radovich, R. E. Sparks, "Electrophoretic techniques for concentrating concentration polarization in ultrafiltration"(Ultrafiltration membranes and applications, A. R. Cooper editor, Plenum Press, New York 1980).

J. M. Radovich, N. S. Mason & R. E. Sparks, "Coupling Electrophoresis with ultrafiltration for improved processing of Plasma Proteins" (Separation Science and Technology, 15, (8), pp 1491–1980), J. M. Radovich & I. M. Chao, "Electro-ultrafiltration of a cationic electro-deposition paint" (J. of Coating Technology, 54, (695), p 33–1982), H. Yukawa, K. Shimura, A. Suda & A. Maniwa, "Characteristics of cross flow electro-ultrafiltration for colloidal solution of proteins" (J. of Chemical Engineering of Japan, 16, (3), p 246–1983).

However this technique of electro-ultrafiltration incurs a serious, intrinsic drawback: according to the implications of the prior art, it is impossible to use several juxtaposed semi-permeable membranes in order to define adjacent compartments to increase the exchange area in the manner it is done in conventional ultrafiltration. No matter which the direction of the electric field, the decrease in the concentration gradient near a particular membrane would likely increase this gradient near two adjacent membranes because then the electric field would be pointing the wrong direction for these two, and the gain in efficiency achieved by the electric field on half the membranes would be wiped out by the loss in efficiency of the other membranes subjected to this field. In some of the equipment known, as alternation is introduced between semi-permeable ultrafiltration membranes and solvent-impermeable membranes (U.S. Pat. Nos. 3,905,886 and 4,043,896). Therein, one membrane out of two carries out the ultrafiltration in a single direction (the electric field being applied so as to reduce the gradient near the semi-permeable membranes). The function of the other membranes merely is to keep the compartments apart. The drawback of this equipment is that for constant bulk, the exchange surface is cut in half relative to a conventional ultrafiltration apparatus, whereby the significance of electro-ultrafiltration is mostly lost.

The primary object of the present invention is to improve the process of electro-ultrafiltration so as to combine the advantages of conventional ultrafiltration having serial semi-permeable membranes with those of electro-ultrafiltration having an applied electric field.

Accordingly the main object of the invention is to benefit both from large exchange areas at a given bulk and permanently increased efficiency.

The process of the invention makes it possible to separate electrically charged solid particles or macromolecules contained in a solvent, colloids contained in baths, charged particles suspended in a liquid etc. This process makes use of semi-permeable membranes which are specific for the separation to be carried out, that is, they will assure filtration of the particles or macromolecules concerned. Hereafter these membranes are denoted by "specific semi-permeable membrane" (to contrast with the already cited impermeable membranes).

The process of the present invention comprises arranging opposite one another n specific semi-permeable membranes to define $n-1$ intermediary compartments located between the membranes and bounded by two lateral compartments, with $n \geq 2$, placing an electrolytic solution in one compartment out of two at a so-called low pressure and placing the treatment solution in the other compartments at a higher, so-called high pressure, whereby the filtration in an intermediate compartment takes place in opposite directions through the two specific semi-permeable membranes bounding it either toward the intermediary compartment if it is a low-pressure compartment or toward the two adjoining compartments if it is a high-pressure compartment, and applying an electric field through the $n+1$ compartments by periodically reversing the direction of this field at a frequency less than about 0.2 Hz.

Accordingly the process of the invention directly places in series several specific semi-permeable membranes in such a manner that the filtration takes place in one direction for a given membrane and in the opposite direction for the two adjacent membranes. No solvent-impermeable membrane is needed (it should be noted that such membranes where called for may be used for auxiliary functions in special cases, in particular to demineralize, as will be seen further below). Experiment has shown in surprising manner that the periodic reversal at very low frequency of the electric field causes an increase (sometimes very large) of the overall efficiency relative to conventional ultrafiltration carried out under the same operating conditions. This surprising effect is probably due to different kinetics for the decrease in concentration and the increase in concentration near the two adjacent membranes at a given direction of the electric field during a short-term state. Accordingly as regards a particular membrane overall, the alternating field causes a decrease in concentration and thus evinces an effect for reducing the concentration gradient near each membrane: thereby the electric field allows substantially reducing the loss in efficiency of separation after some operating time for all the juxtaposed semi-permeable membranes.

It should be noted that in a closely related field, the U.S. Pat. No. 3,990,968 describes a reverse-osmosis technique separating particles by applying a high-frequency AC field (from 30 to 10,000 and preferably from 500 to 5,000 Hz).

However this technique requires one porous electrode attached to each membrane and involves basically different phenomena: the object of the electric field is to resonate the materials in order to decrease the dielectric constant of the medium and therefore it must be very close to the frequency of the relaxation of the molecules. In this patent, this decrease of the dielectric constant is said to increase the transfers.

The equipment structure of the invention is much different due to comprising only one electrode on each side of the set of membranes and the electric-field effects move the charged particles relative to the membranes. Between two reversals, the field must be applied to DC manner over a sufficiently long time (at least 5 s) for effective particle motion to take place. The advantageous effect of the periodic field reversal is due to the difference in kinetics between the motions toward each membrane and the motion in the opposite direction. This is the effect used to reduce the concentration gradient near the membranes and to increase thereby very substantially the material transfers.

Depending on the application, two or more specific semi-permeable membranes may be placed in series.

In an embodiment optimizing the process, the reversals of the electric field direction are carried out at time intervals from 0.5 to 15 minutes, in particular between 2 and 5 minutes. The latter range appears definitely advantageous as shown by experiment and implements separation during a sequence of transient states which follow each reversal during which the increases and decreases in concentrations follow much different kinetics.

The apparently optimal implementing conditions are the following: the electric field is set within a range from 3 to 20 v/cm whereby the resulting current density in the compartments is less than 40 ma/cm$^2$, the pressure in the low-pressure compartments is set a value close to atmospheric, the absolute pressure in the high-pressure compartments is between 1.5 and 6 bars.

The process of the invention applies wherever electrically charged macromolecules or particles must be separated from a solution. In particular the process can be carried out to ultrafilter charged macromolecules less than 200 Angstroms (fractionation, concentration or purification). It can also be used to tangentially micro-filter charged solid particles less than 10 microns.

The process of the invention can be combined with another treatment of the solution, in particular a treatment to modify the contents in small size ions (demineralization or, where called for, mineral ion concentration). In that case at least two ion-exchange membranes must be provided to define within the equipment a volume of ion concentration or of demineralization, on one hand, and on the other, an electric field must be applied which is periodically reversed in direction for different times in each. The variation of the ion concentration assumes a symmetrical kinetics for the two directions of the electric field, whereby the field application for different times in different directions allows overall concentration or demineralization depending on the privileged direction while nevertheless retaining gradient reduction for the particle or macromolecule concentration near the specific semi-permeable membranes.

The invention also comprises separation equipment of the type having a high-pressure compartment containing a solution to be treated, a low-pressure compartment containing an electrolytic solution, a specific filtration semi-permeable membrane located between said compartments, and electrodes to apply an electric field across said compartments. In the present invention, this equipment comprises n specific filtration semi-permeable membranes opposite one another to determine an alternation of high and of low pressure compartments ($n \geq 2$), the electrodes being located on each side of the two lateral compartments and connected to suitable electric means to feed them a periodically reversing voltage difference.

In a preferred embodiment mode, these electric means comprise a DC generator associated with a polarity inverter programmed at an inverting frequency between $5 \times 10^{-4}$ and $1.5 \times 10^{-2}$ Hz.

Figure 2:
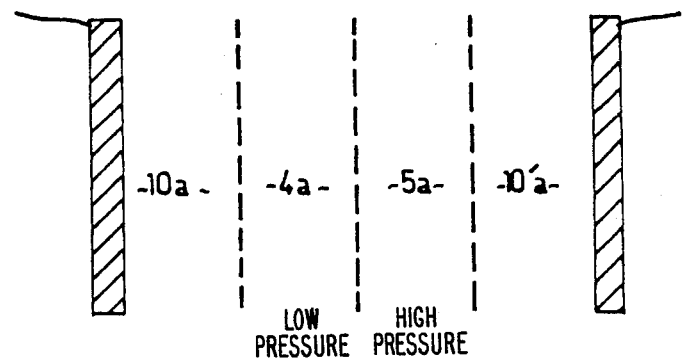
Figure 3:
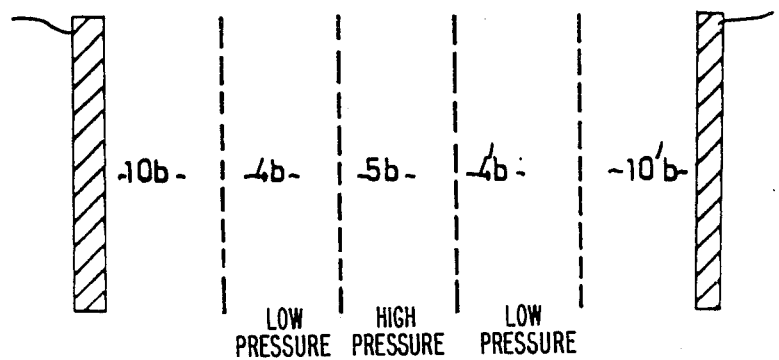
Figure 4:
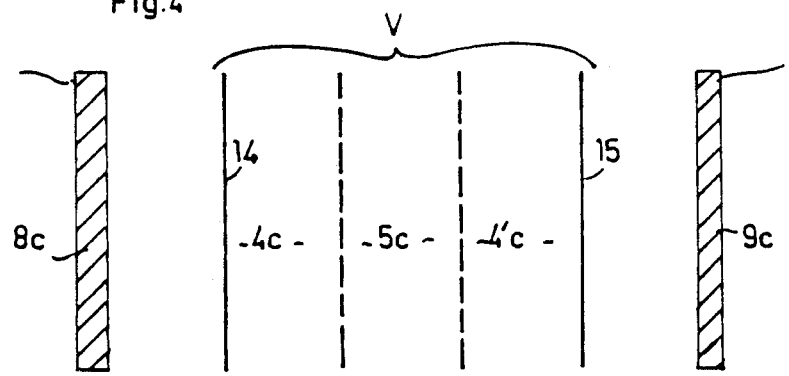
Figure 5:
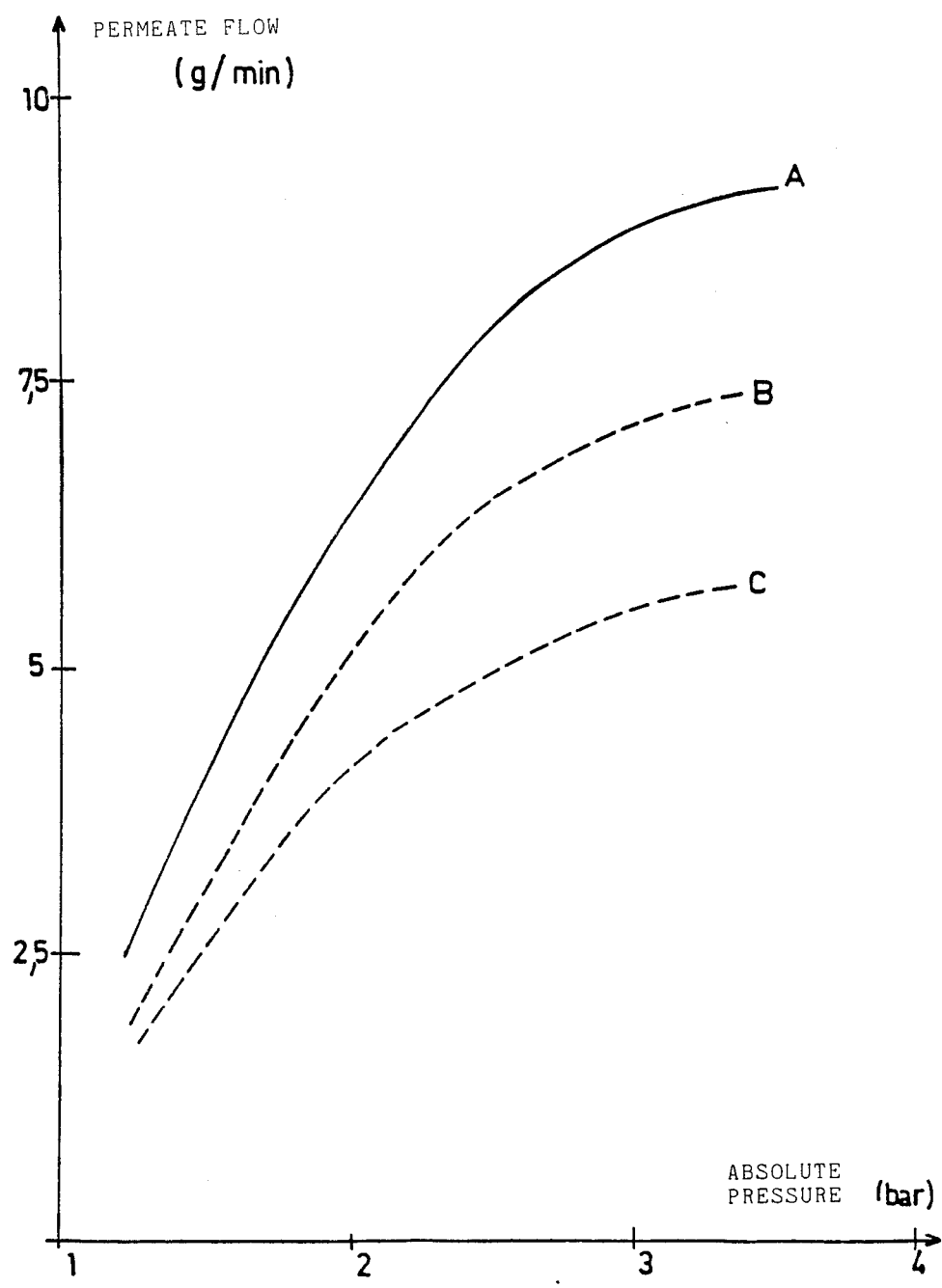
Figure 6:
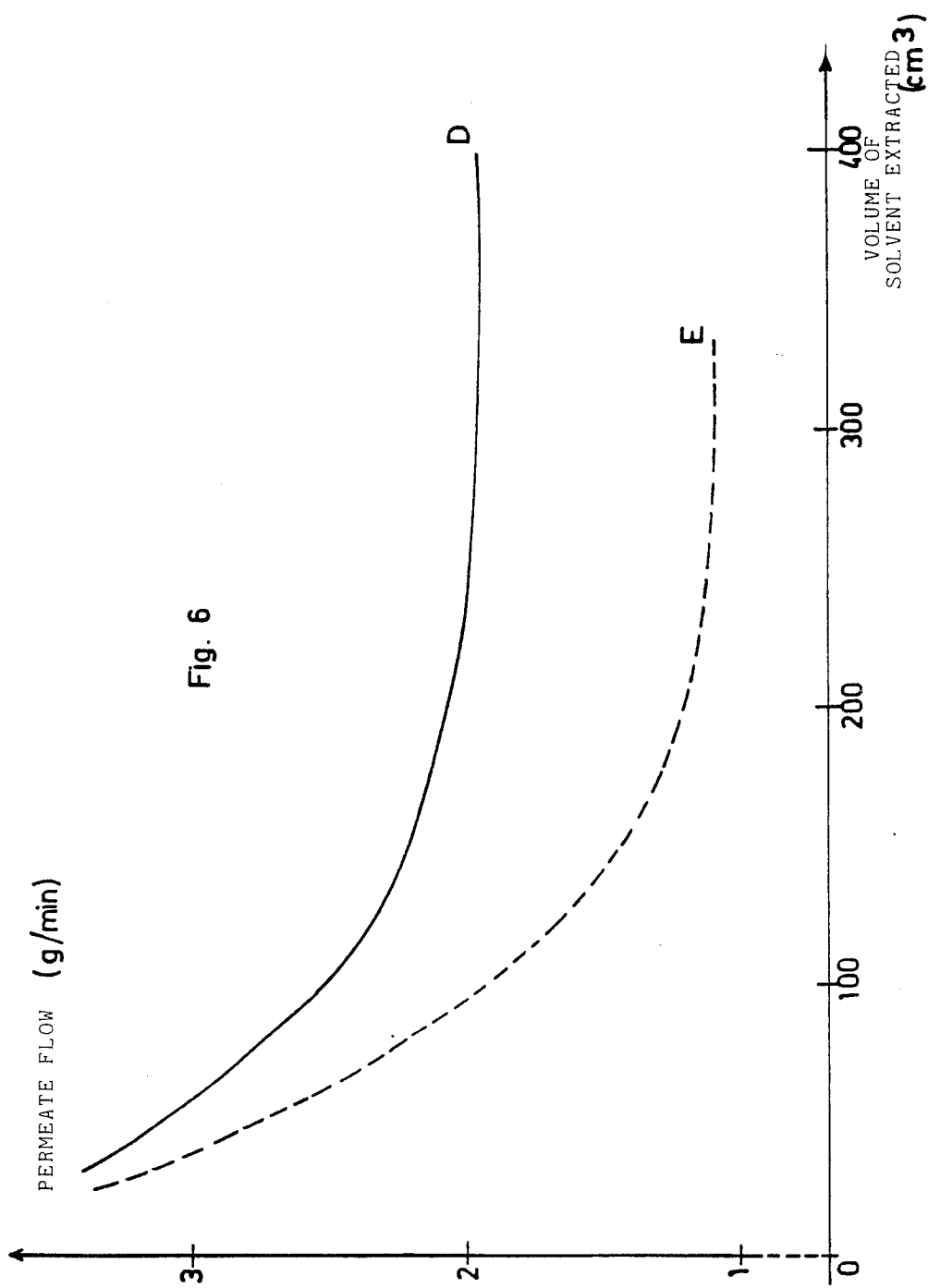
Figure 7:
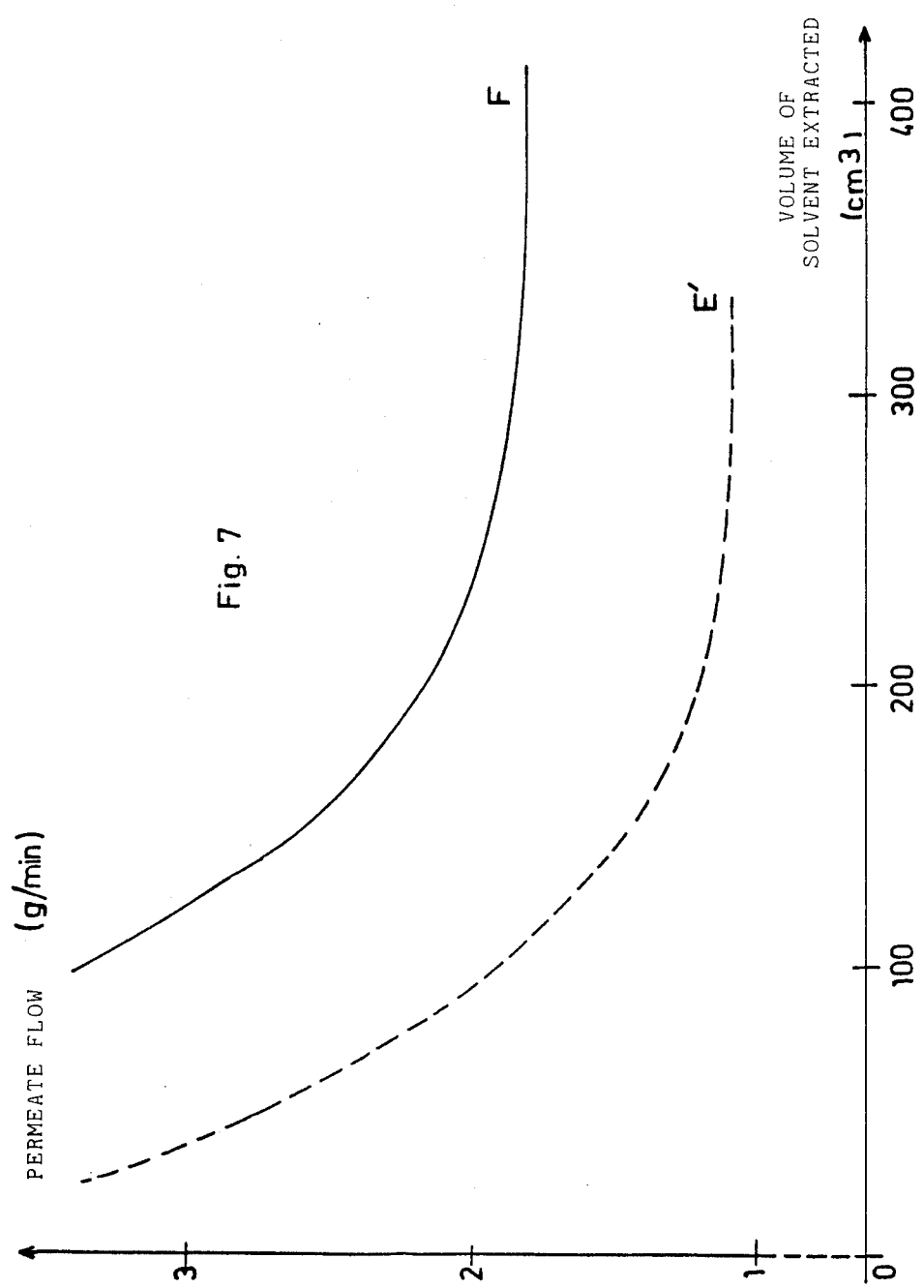
Figure 8:
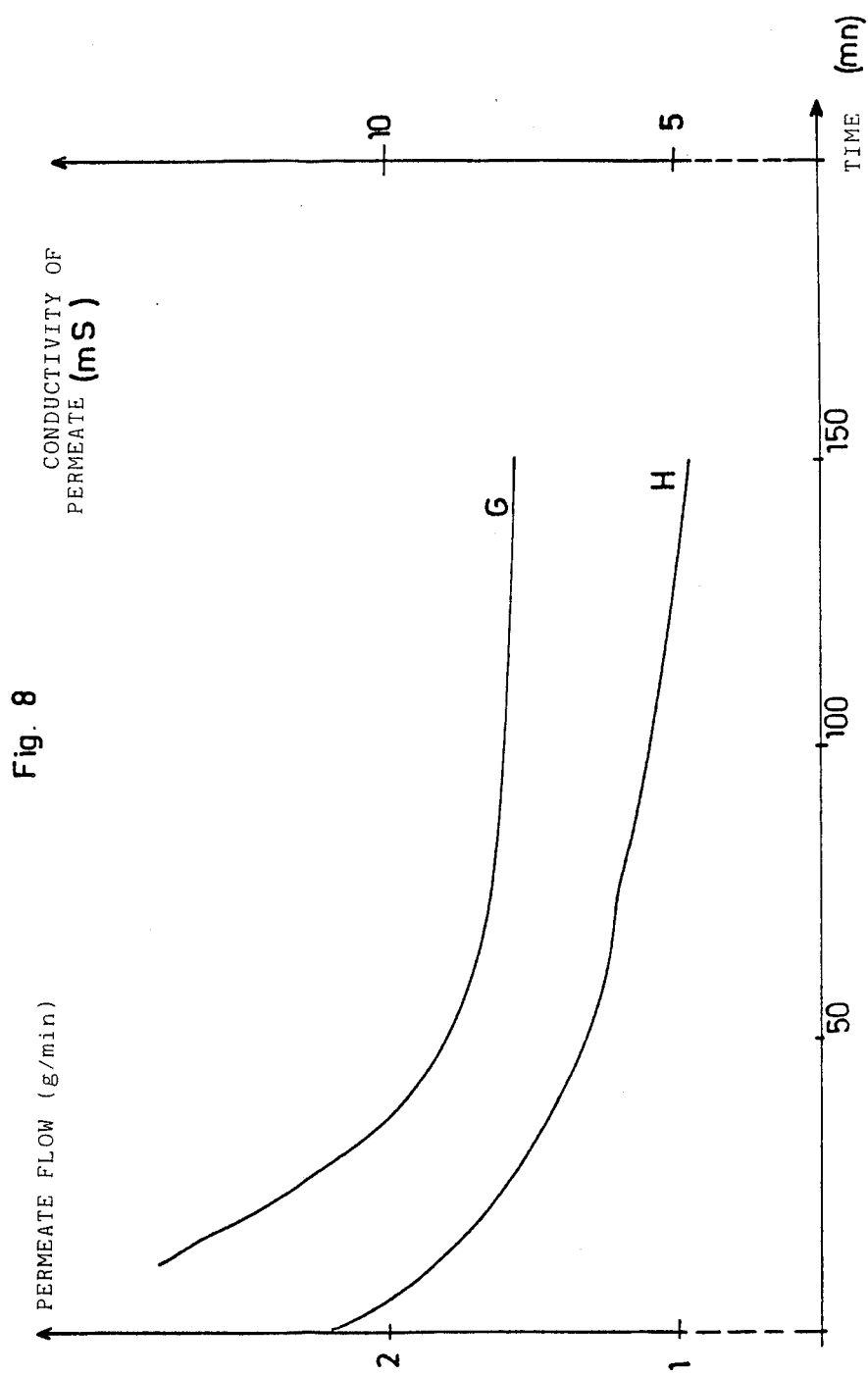

The description below discusses embodiment modes of the equipment of the invention in relation to the attached drawings and implementation of the process:

FIG. 1 is a schematic overall view of the separation equipment of the invention, FIG. 2 is a diagram of the equipment used to carry out Example 1, and FIG. 3 is a diagram of the equipment used to carry out Examples 2 and 3, and FIG. 4 is a diagram of the equipment used to carry out Example 4, FIG. 5 is a comparison graph showing the results obtained in Example 1 and those from conventional ultrafiltration, FIG. 6 is a comparison graph of the results of Example 2, FIG. 7 is a comparison graph of the results of Example 3, FIG. 8 is a graph of the results of Example 4.

The schematically shown equipment of FIG. 1 separates by filtration electrically charged solid particles or macromolecules contained in a solution.

This equipment comprises a conventional structure 1 of the filter press type making it possible to emplace a series of n membranes parallel and opposite each other so as to define operational compartments. This structure is formed conventionally by stacking electrically insulating frames.

In the equipment shown in FIG. 1, all the membranes 2, 3, . . ., are specific semi-permeable membranes for the separation to be carried out. In the Examples shown further below, the semi-permeable membranes used are made of polyacrylonitrile with a cut-off threshold of 10,000 and with an effective area of 55.2 cm$^2$ (semi-permeable membranes made by Rhone-Poulenc as "Iris 3038").

As will be seen further below, this geometry does not prevent emplacing other membranes for auxiliary functions such as demineralizing the solution. However these additional membranes do not act in the separation at all and do not modify the phenomena involved in filtration.

In this embodiment, the n membranes 2, 3 define n−1 compartments 4, 5 . . . which are alternatingly supplied with an electrolytic solution at low pressure contained in a reservoir 6 and with high pressure by the solution to be treated which is contained in the reservoir 7.

In the embodiments below, the electrolytic solution is a solution of sodium chloride at atmospheric pressure except for pressure losses. The solution to be treated is fed at an absolute pressure varying from 1.5 to 3.5 in the Examples. Pressurization can be by any conventional means (pressurized reservoir, constricting valve, etc.). Pumps provide the circulation.

In the embodiment of FIG. 1, the liquid circuits are in parallel. They may also be series connected or in any other known combination.

The equipment is closed on each side by an electrode 8 and 9 of a known type (graphite, platinum, stainless steel). Together with the two end membranes, these electrodes bound two lateral compartments such as 10 wherein circulates an electrolytic solution contained in a reservoir 11. In the Examples discussed below, this solution is identical with that initially contained in the reservoir 6.

The two lateral compartments 10 adjacent to the electrodes form a separate circuit in order not to mix any possibly formed electrochemical reaction products with the other solutions.

The electrodes 8 and 9 are connected to a DC generator 12 through a polarity inverter 13 of a conventional type. In the Examples 1, 2, and 3 described below, the polarities are reversed periodically at time intervals of 1, 5 or 15 minutes. In the Example 4, the inversion cycle is asymmetrical (5/10 minutes).

EXAMPLE 1

Electro-ultrafiltration of an aqueous solution of bovine albumin.

This Example was carried out with equipment of the above described type and comprising three specific semi-permeable membranes as diagrammatically shown in FIG. 2.

The albumin solution to be treated and fed into the high-pressure compartment 5a is at a pH of 3 and contains 5 g of albumin per liter (at this pH, the protein is positively charged and its diameter is about 60 A). The electrolytic solution fed both into the intermediary, low-pressure compartment 4a and the lateral compartments 10a, 10'a is at an initial concentration of 1 g/l of sodium chloride and its pH is 3.

The permeate flow is measured at various pressures, namely the amount of solvent crossing per unit time the specific semi-permeable membranes. This flow reflects the filtration efficiency.

In FIG. 5, the curve A shows the results obtained under the following conditions:
polarity reversal every 15 minutes,
current density in the compartments = 18.2 ma/cm$^2$ The experiments were carried out in comparative manner: on one hand without current reversal (curve B), on the other hand without current (curve C).

Substantial improvement is shown by the process of the invention regardless of pressure.

It should be noted that the test run without current reversal will result in almost the same curve B by using three semi-permeable membranes (FIG. 2) or only one central one, the other being mere membranes to separate the lateral compartments (in the manner of the apparatus described in the U.S. Pat. Nos. 3,905,886 and 4,043,896). This proves that these known electro-ultrafiltration apparatus do not respond to arranging a semi-permeable membrane next to an active semi-permeable membrane.

EXAMPLE 2

Electro-ultrafiltration of a sweet lactoserum solution.

This example was carried out using the same equipment comprising four specific semi-permeable membranes as shown in FIG. 3. These membranes bound: a high-pressure intermediate compartment 5b into which is fed the sweet lactoserum solution (6 g/l of protein, pH = 6.8, protein diameter between about 20 and 100 A), two low-pressure intermediary compartments 4b and 4'b into which is fed the electrolytical solution (6 g/l of sodium chloride, pH = 6.8), two lateral compartments 10b and 10'b into which is fed a solution identical with the above one.

The absolute operating pressure is set at 3 bars in the high-pressure compartment 5b (the low-pressure compartments 4b, 4'b being at atmospheric pressure).

The permeate flow and the volume of extracted solvent are measured as a function of time.

In FIG. 6, the curve D shows the results obtained under the following conditions:
polarity inversion every 5 minutes,
current density = 27 ma/cm$^2$.

A control test was carried out in absence of current (conventional ultrafiltration) and resulted in curve E. The drop in efficiency is substantially less in the case of the process of the invention.

(It should be noted that there was no control test without reversal of current because in that case a single semi-permeable membrane would be active and the assembly no longer would be economical.)

EXAMPLE 3

Varying the Parameters

This Example is carried out in the same experimental conditions as Example 2 except for the two following parameters:
polarity inversion every minute
current density = 18.2 ma/cm$^2$.

The results are shown by curve F (FIG. 6); the control test (corresponding to E, no current) is shown by curve E'.

The same comments as above apply to this Example.

EXAMPLE 4

Electro-ultrafiltration of a lactoserum solution in combination with electrodialysis This Example shows that the separation process of the invention is compatible with simultaneous electrodialysis treatment (demineralization).

This example is carried out in equipment similar to that of Examples 2 and 3 above except that the membranes adjacent to the electrodes are replaced by solvent-impermeable electrodialytic membranes 14 and 15 but being permeable to anions (membrane 14) and permeable to cations (membrane 15)—(FIG. 4).

Membrane 14 is an ion-exchange membrane on which are grafted quaternary ammoniums (Rhone-Poulenc "ARP"). The membrane 15 is a cation-exchange membrane on which are grafted sulfonated groups (Rhone-Poulenc "CRP"). Therefore, superposed on the three intermediate separating compartments bounded by the specific semi-permeable membranes (high-pressure 5c, low-pressure 4c, 4'c), these ion-exchange membranes 14 and 15 bound a volume V where the overall demineralization of the solutions circulating in this volume takes place.

For that purpose, the polarity-inversion cycle is made asymmetrical as the demineralization phenomenon is totally reversible: the current goes from the electrode 8c to the electrode 9c for time intervals of 10 minutes (direction of one demineralization in volume V), the current goes from the electrode 9c to the electrode 8c for time intervals of 5 minutes (direction of one salt concentration in volume V). In this manner the desired improved separation of the macromolecules and overall demineralization of the solutions are simultaneously achieved.

FIG. 8 illustrates the results from lactoserum identical to that of Examples 2 and 3 at a current density of 18.2 ma/cm$^2$.

Curve G shows the permeate flow as a function of time and the efficiency in separating proteins from the lactoserum. Curve H shows the permeate conductivity (in millimhos) as a function of time and shows the reduction of salt concentration in the permeate.

In practice therefore it is possible to achieve a desired salt concentration by controlling the permeate conductivity and by re-establishing the symmetry of the polarity-inverting periods once the desired concentration has been reached (which stops the overall effect of salt-concentration variation).

We claim:

1. A process for separating electrically charged macromolecules or solid particles contained in a solution, by filtering the pressurized solution through a semi-permeable membrane specific to the separation and by applying an electric field to reduce the concentration gradient in the immediate vicinity of the membrane, said process comprising mounting n specific semi-permeable membranes (2, 3) opposite each other in order to bound n−1 intermediate compartments (4, 5) located between said membranes and limited by two lateral compartments (10), with n≧2, placing an electrolytic solution in at least one of said compartments at a first pressure, placing the solution to be treated in the other of said compartments at a pressure higher than said first pressure, whereby the filtration in an compartment (4, 5) takes place in opposite directions through the two specific semi-permeable membranes bounding the compartment, either toward said compartment if it is a low-pressure compartment or toward the two adjoining compartments it it is a high-pressure compartment, and applying an electric field to said compartments and periodically reversing the direction of said field at a frequency less than about 0.2 Hertz.

2. A separation process as in claim 1, and including providing two of said specific semi-permeable membranes opposite one another, placing the electrolytic solution in the two lateral compartments on either side of said specific semi-permeable membranes, placing the solution to be treated in the intermediate compartment between said specific semi-permeable membranes so that filtration occurs in opposite directions through the two membranes and is directed toward the lateral compartments, and applying an electric field by electrodes located on each side of the lateral compartments, providing a voltage difference across said electrodes and periodically reversing said voltage difference.

3. A separation process as in claim 1, and including providing a sequence of at least 3 specific semi-permeable membranes opposite each other, placing the electrolytic solution and the solution to be treated in said compartments so as to obtain an alternation of low-pressure and of high-pressure compartments separated from each other by said specific semi-permeable membranes, whereby filtration through one membrane is opposite in direction to that taking place through the adjoining membranes, and applying the electric field through two electrodes (8, 9) located on each side of the lateral compartments and periodically reversing the voltage difference.

4. A separation process as in claim 1 and wherein the direction reversals of the electric field take place at time intervals from 0.5 to 5 minutes.

5. A separation process as in claim 1, and including periodically reversing the electric field within a range from 3 to 20 volts/cm so that the resulting current density in the compartments is less than 40 ma/cm$^2$.

6. A separation process as in claim 1 and wherein the pressure in the low-pressure compartments is near atmospheric and the absolute pressure in the high-pressure compartments is between 1.5 and 6 bars.

7. A separation process as in claim 1 and including carrying out ultra-filtration of charged macromolecules less than 200 angstroms in size.

8. A separation process as in claim 1 and including carrying out tangential microfiltration of solid charged particles less than 10 microns in size.

9. A separation process as in claim 1 for separating charged particles or macromolecules contained in a solution and thereby modifying the small-size ion concentration of said solution, placing at least two ion-exchange membranes (14, 15) so as to bound a volume (V) comprising said intermediate compartments for demineralizing or concentrating ions, and applyng a periodically reversed electric field for different lengths of time in different directions.

10. An apparatus for separating electrically charged macromolecules or solid particles comprising n specific semi-permeable filtration membranes spaced apart so as to define n−1 intermediate compartments, said intermediate compartments being alternately high and low pressure compartments with the high-pressure compartments containing a solution to be treated and the low-pressure compartments containing an electrolytic solution, a lateral compartment adjacent each outermost of said intermediate compartments and each of said lateral compartments having an electrode, means for supplying an electrical field from said electrodes through said compartments, and means for periodically reversing said electrical field at a frequency of not less than about 0.2 Hertz.

11. Separation apparatus as in claim 10, and wherein the electric field supplying means includes a DC generator (12) and a polarity inverter (13) programmed at an inverting frequency of between $5 \times 10^{-4}$ and $1.5 \times 10^{-2}$ Hz.

12. Separation apparatus as in claim 11, and further including at least two ion-exchange membranes (14, 15) located on opposite sides of said semi-permeable membranes, the electric field supplying means (12, 13) being designed to feed to the electrodes a voltage difference first in one direction and then in the other for different lengths of time.

* * * * *